Aug. 29, 1933. E. G. PETERSEN 1,924,654
COOLING AIR FLOW CONTROL FOR VEHICLE ENGINES
Filed March 19, 1930 2 Sheets-Sheet 2
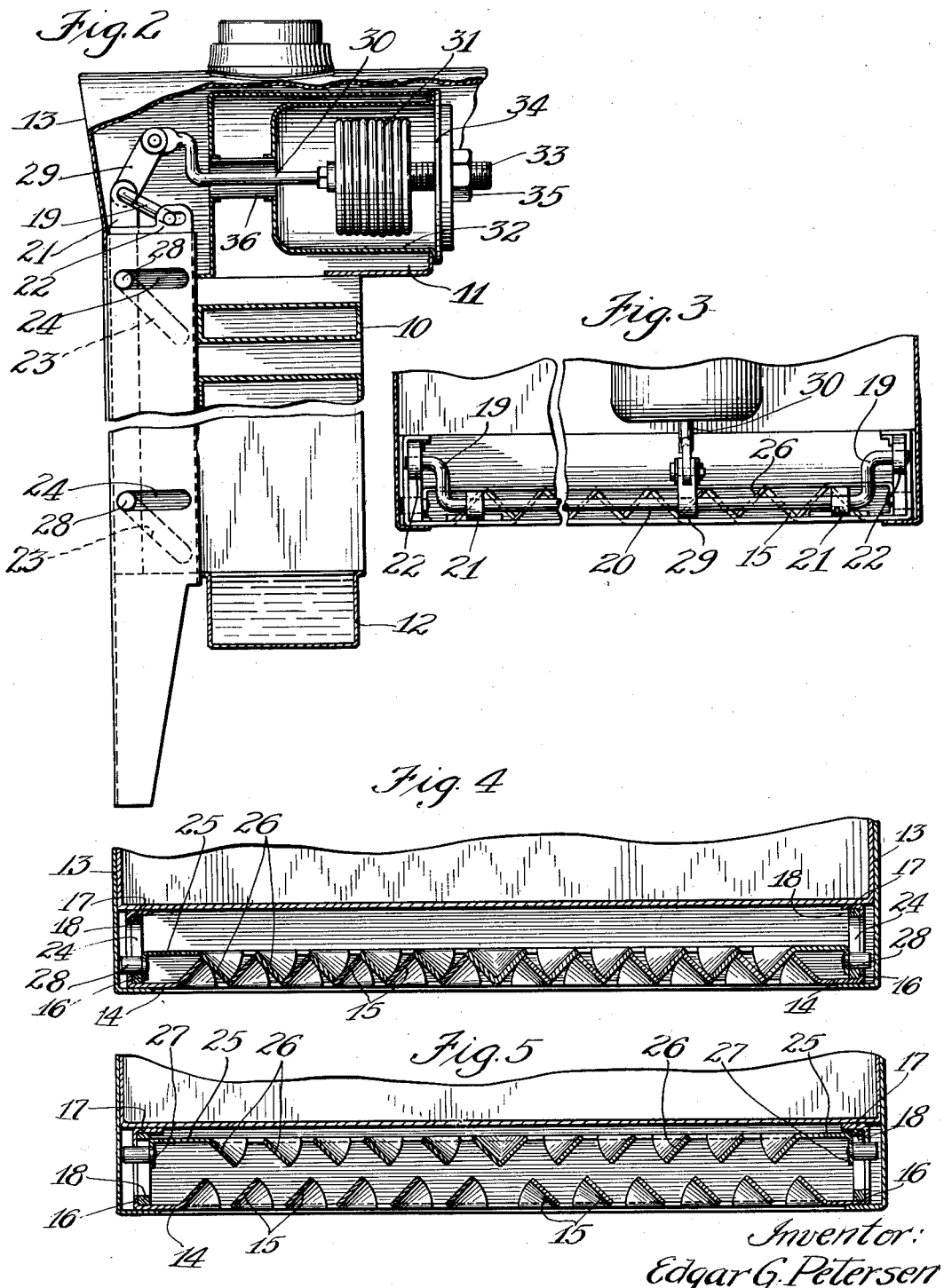
Inventor:
Edgar G. Petersen Patented Aug. 29, 1933

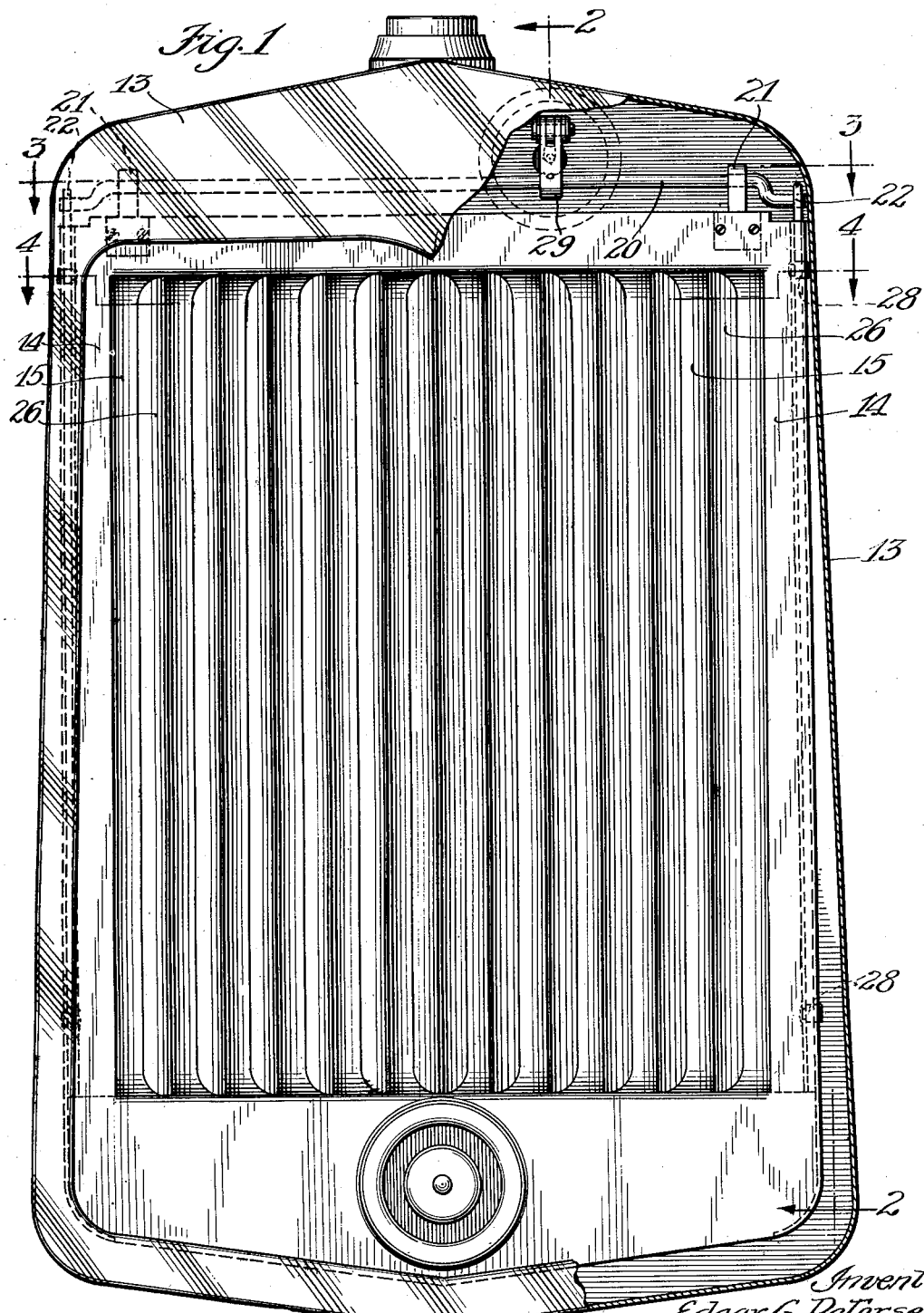

1,924,654

UNITED STATES PATENT OFFICE 1,924,654

COOLING AIR FLOW CONTROL FOR VEHICLE-ENGINES

Edgar G. Petersen, Chicago, Ill., assignor to Pines Winterfront Company, Chicago, Ill., a corporation of Delaware Application March 19, 1930. Serial No. 436,942

5 Claims. (Cl. 189—61)

My invention relates to an apparatus for controlling the flow of cooling air to an engine,—as for instance by regulating the flow of air through the core of the radiator of a liquid cooled engine forming part of the power plant of an automotive vehicle.

According to the present invention, the flow of cooling air is not controlled by a plurality of individually pivoted shutters, as is the common practice, but to the contrary, the flow of air is determined by the relative positions of a pair of plates having louvers formed therein. These louvers, in one relation of the plates, prevent the flow of cooling air to the engine, in another relation of the plates permit relatively unrestricted flow of cooling air to the engine, and act to vary the flow of air as and when the relation of the plates is being changed, the change in the relative positions of the plates being preferably, but not necessarily, accomplished thermostatically.

In the accompanying drawings depicting an illustrative embodiment of my invention, Fig. 1 is a front view of an automobile radiator equipped with the improvements of the present invention;

Fig. 2 is a broken sectional view which may be regarded as taken on the line 2—2 of Fig. 1 and looking in the direction indicated by the arrows;

Fig. 3 is a broken horizontal sectional view taken on the line 3—3 of Fig. 1 and looking in the direction indicated by the arrows;

Fig. 4 is a horizontal sectional view taken on the line 4—4 of Fig. 1 and looking in the direction indicated by the arrows, this view illustrating the relative positions of the louver carrying plates when co-operating to prevent flow of air through the radiator core; and Fig. 5 is a view corresponding to Fig. 4 but illustrating the louver carrying plates in their open relation.

Similar characters of reference refer to similar parts throughout the several views.

Referring first to Fig. 2, reference character 10 illustrates the core of what may be regarded as a conventional radiator having upper and lower water boxes or headers indicated respectively at 11 and 12. The radiator is provided with the customary shell 13 adapted to overlie the margins of the front face of the radiator core and to cover the sides and all front parts of the radiator except the core.

It will be understood, of course, that the radiator is of the customary type constituting the front wall of a hooded compartment in which is located an engine and other devices constituting the power plant of an automotive vehicle, tanks 11 and 12 of the radiator having suitable connection with the water jackets of the engine in the well known manner.

Located and fixedly retained between the radiator and the continuous marginal flange of the radiator shell is a plate 14 provided with a plurality of louvers 15, pressed from the metal of the plate, all of these louvers being inclined rearwardly toward the medial vertical plane of the radiator. It will be noted that the lateral margins of the plate 14 are turned rearwardly to provide flanges 16, 16, which in turn are rebent toward the medial vertical plane of the radiator to provide flanges 17, 17.

Depressed against the inner surfaces of the flanges 16, 16 and being embraced between the plate 14 and its rebent flange portions 17, 17, are bars 18, 18, these bars being capable of vertical reciprocation accomplished by cranks 19, 19, formed upon a shaft 20. The shaft 20 is mounted in suitable bearings 21, 21 supported by the upper portion of the plate 14 as shown.

The cranks 19 of the shaft 20 engage in slotted ears 22 which are formed upon the upper ends of the bars 18 as shown in Figs. 2 and 3.

It will be noted that each of the bars 18 is provided with a pair of inclined slots 23, 23, and that each of the flanges 16 of the plate 14 is provided with a pair of horizontal slots 24, 24.

Disposed between the plate 14 and the front face of the radiator core is a second metal plate 25 provided with a plurality of louvers 26, said louvers extending forwardly from the plate 25 and all being inclined at right angles to the louvers 15 of the plate 14, the louvers of the two plates being so disposed with respect to each other that they will assume the relative positions shown in Fig. 4 when the plate 25 is moved forwardly from the position shown in Fig. 5.

Plate 25 is provided with forwardly turned lateral flanges 27 having sliding contact with the inner faces of the cam-slotted bars 16, 16, each of said flanges 27 carrying a pair of pins 28, 28. Each of the pins 28 extends through one of the cam slots 23 of the adjacent bar 18 and also extends through a slot 24 of one of the lateral flanges 16 of the front plate 14.

By virtue of the engagement of the pins 28 with the horizontal slots 24, the rear plate is rendered capable of horizontal movement, but is restrained against vertical movement. And by virtue of the engagement of the several pins 28 with the cam slots 23, the rear plate 25 occupies the position shown in Fig. 4 when the bars 18 are depressed to the position shown in Fig. 2, said rear plate 25 being moved rearwardly toward the position shown in Fig. 5 when the bars 18 are elevated by partial rotation of the shaft 20.

When the plates 14 and 25 occupy the relative positions shown in Fig. 5, substantially unrestricted flow of air through the radiator core is permitted. As the plate 25 is moved forwardly, the flow of air through the radiator core is variably restricted until the plate 25 reaches the position shown in Fig. 4, at which time the flow of air through the radiator core is prevented.

It will be understood that the partial rotations of the shaft 20, which are necessary to move the rear plate 25 from the position shown in Fig. 5 to the position shown in Fig. 4, and vice versa, may be accomplished by any well known manually operable means accessible at the dash or other position available to the driver of the vehicle with which the present improvements are associated. However, I prefer to operate the mechanism thermostatically. To this end I provide the shaft 20 with an operating crank 29 which in turn is pivotally connected with the front end of a rod 30 having its rear end mechanically connected with the front wall of a thermostat 31 of the well known metal bellows type, the said thermostat bellows 31 being adjustably mounted in a chamber 32, the outer surfaces of which are in contact with the water in the upper part 11 of the radiator. The rear wall of the thermostat bellows may carry a threaded stem 33 which projects through and has threaded engagement with a plate 34 which closes the open end of the chamber 32, a nut 35 co-operating with the threaded stem 33 to retain the rear wall of the bellows at any position to which it may be adjusted.

A tube 36 extending from the chamber 32 to the forward part of the radiator accommodates the rod 30 which connects the front wall of the bellows with the crank 29. It will be understood, of course, that the bellows 31 contains a suitable thermal fluid so that the bellows 31 will expand in response to increased temperature of the water flowing through the radiator, to move the plate 25 away from the plate 14 and permit the flow of air through the radiator core, the bellows collapsing when the temperature of the water flowing through the radiator diminishes, to move the plate 14 toward the closed position shown in Fig. 4.

Having thus illustrated and described one embodiment of my invention, what I claim as new and desire to secure by Letters Patent of the United States is:

1. In a radiator shutter the combination of a support with a pair of louver plates, each of said louver plates being formed with a plurality of parallel openings between diagonally extending flanges struck out of the body of said plates, and the ends of said flanges being joined to the plates from their edges by an integral part of the flanges and plates, the flanges of one louver plate extending diagonally in one direction, and the flanges of the other louver plate extending diagonally in a transverse direction, and means for regulating the flow of air between said flanges, comprising operative mechanical connection between said louver plates to move the edges of the flanges of one plate relative to the edges of the flanges of the other plate, said shutter being closed by bringing the edges of the flanges into engagement with each other.

2. In a radiator shutter the combination of a support with a pair of louver plates, each of said louver plates being formed with a plurality of parallel openings between diagonally extending flanges struck out of the body of said plates, and the ends of said flanges being joined to the plates from their edges by an integral part of the flanges and plates, the flanges of one louver plate extending diagonally in one direction, and the flanges of the other louver plate extending diagonally in a transverse direction, and means for regulating the flow of air between said flanges, comprising operative mechanical connection between said louver plates to move the edges of the flanges of one plate relative to the edges of the flanges of the other plate, said shutter being closed by bringing the edges of the flanges into engagement with each other, said louvers being arranged with the flanges extending in a vertical direction from a point adjacent the lower boundary of a radiator opening to a point adjacent the upper boundary.

3. In a radiator shutter the combination of a support with a pair of louver plates, each of said louver plates being formed with a plurality of parallel openings between diagonally extending flanges struck out of the body of said plates, and the ends of said flanges being joined to the plates from their edges by an integral part of the flanges and plates, the flanges of one louver plate extending diagonally in one direction, and the flanges of the other louver plate extending diagonally in a transverse direction, and means for regulating the flow of air between said flanges, comprising operative mechanical connection between said louver plates to move the edges of the flanges of one plate relative to the edges of the flanges of the other plate, said shutter being closed by bringing the edges of the flanges into engagement with each other, said louvers being arranged with the flanges extending in a vertical direction from a point adjacent the lower boundary of a radiator opening to a point adjacent the upper boundary, and the flanges of one of said louver plates being arranged in two series extending in directions transverse to each other, each series controlling substantially half of the air flow area of the radiator, the flanges of the other louver plate being also arranged in two series and extending in a direction transverse to the adjacent flanges of the first-mentioned louver plate.

4. In a radiator shutter the combination of a support with a pair of louver plates, each of said louver plates being formed with a plurality of parallel openings between diagonally extending flanges struck out of the body of said plates, and the ends of said flanges being joined to the plates from their edges by an integral part of the flanges and plates, the flanges of one louver plate extending diagonally in one direction, and the flanges of the other louver plate extending diagonally in a transverse direction, and means for regulating the flow of air between said flanges, comprising operative mechanical connection between said louver plates to move the edges of the flanges of one plate relative to the edges of the flanges of the other plate, said shutter being closed by bringing the edges of the flanges into engagement with each other, one of said louver plates being fixedly supported with respect to the radiator, and the other of said louver plates being supported for movement in a direction at right angles to the plane of said louver plates to control the effective opening between said louver plates.

5. In a radiator shutter the combination of a support with a pair of louver plates, each of said louver plates being formed with a plurality of parallel openings between diagonally extending flanges struck out of the body of said plates, and the ends of said flanges being joined to the plates from their edges by an integral part of the flanges and plates, the flanges of one louver plate extending diagonally in one direction, and the flanges of the other louver plate extending diagonally in a transverse direction, and means for regulating the flow of air between said flanges, comprising operative mechanical connection between said louver plates to move the edges of the flanges of one plate relative to the edges of the flanges of the other plate, said shutter being closed by bringing the edges of the flanges into engagement with each other, the width of said flanges being substantially equal to the width of the slots between said flanges, whereby a maximum opening is provided when said louver plates are spaced and said flanges are adapted to close the opening between flanges of the opposite plate when said plates are in engagement with each other.

EDGAR G. PETERSEN.